US 10,055,269 B2

(12) United States Patent
Geiger et al.

(10) Patent No.: US 10,055,269 B2
(45) Date of Patent: Aug. 21, 2018

(54) ADDITIONAL MESSAGE INFORMATION HANDLING FOR APPLICATIONS

(71) Applicant: SAP SE, Walldorf (DE)

(72) Inventors: Matthias Geiger, Schwetzingen (DE); Nils Obermiller, Heidelberg (DE); Frank Jentsch, Muehlhausen (DE); Natalia Timchuk, Muehlhausen (DE); Ralf Handl, Heidelberg (DE); Olaf Tennie, Heidelberg (DE); Frank Brunswig, Heidelberg (DE)

(73) Assignee: SAP SE, Walldorf (DE)

(*) Notice: Subject to any disclaimer, the term of this patent is extended or adjusted under 35 U.S.C. 154(b) by 164 days.

(21) Appl. No.: 14/946,944

(22) Filed: Nov. 20, 2015

(65) Prior Publication Data

US 2017/0147424 A1    May 25, 2017

(51) Int. Cl.
*G06F 11/00* (2006.01)
*G06F 11/07* (2006.01)
*G06F 11/32* (2006.01)

(52) U.S. Cl.
CPC ...... *G06F 11/0706* (2013.01); *G06F 11/0769* (2013.01); *G06F 11/32* (2013.01)

(58) Field of Classification Search
CPC ............ G06F 11/0772; G06F 11/0751; G06F 11/0787; G06F 11/079; G06F 11/0766
See application file for complete search history.

(56) References Cited

U.S. PATENT DOCUMENTS

| | | | | |
|---|---|---|---|---|
| 7,739,346 B1* | 6/2010 | Goldschlager | ........ | H04L 41/069 709/207 |
| 8,068,860 B1* | 11/2011 | Midkiff | ................ | H04W 4/14 455/406 |
| 9,462,570 B1* | 10/2016 | Bostick | ............... | G06F 17/2705 |
| 2006/0167828 A1* | 7/2006 | Di Luoffo | ............... | H04L 41/06 706/60 |
| 2009/0176518 A1* | 7/2009 | Doni | ....................... | H04W 4/12 455/466 |
| 2012/0222048 A1* | 8/2012 | Bharathula | ......... | G06F 11/3006 719/316 |
| 2016/0088022 A1* | 3/2016 | Handa | ............... | G06F 17/30899 726/1 |
| 2017/0083390 A1* | 3/2017 | Talwadker | ............ | G06F 11/079 |

OTHER PUBLICATIONS

CAFC, Electric Power Group, LLC v. Alstom S.A., pp. 1-12 (Year: 2016).*

* cited by examiner

*Primary Examiner* — Bryce P Bonzo
*Assistant Examiner* — Jonathan D Gibson
(74) *Attorney, Agent, or Firm* — Fish & Richardson P.C.

(57) ABSTRACT

Various embodiments of systems and methods to display an additional message information relevant to a product are described herein. Initially a determination is made whether error message, corresponding to a data processing error related to a product, has a corresponding additional message information related to the product. Next, based on the determined additional message information, an additional message information property of the error message is updated to indicate that the error message has the corresponding additional information. Next, based on the updated additional message information property, the additional message information is converted to obtain a converted additional message information in a markup language. Finally the converted additional message information is forwarded to a user interface, where it is displayed.

20 Claims, 8 Drawing Sheets

ADDITIONAL MESSAGE INFORMATION HANDLING FOR APPLICATIONS

BACKGROUND

The use of mobile phones has grown exponentially over the previous decade. The increase in the use of mobile phones has also seen a parallel increase in the number of applications available for download to these devices. One of the key feature that increase likability of any application is the way errors are handled for a particular application.

Typically when an error occurs during processing of a request, received at the application, then the user is provided with an error message that indicates the error in processing the request. At present the error messages are defined corresponding to different type of errors that may be encountered during the processing of a request. These error messages may be defined with respect to a product on which the application is running at the time of defining the error message. When the application is executed on another product then the same error message, which was defined earlier for a different product, is provided to the user. This error message may therefore be irrelevant and confusing for a user.

Further at present there is no error message handling mechanism that allows the seamless transfer of error messages from a backend system to a user interface. A developer has to code separately for each application so that the application can retrieve and display error message. This procedure of hand-coding for each application is time consuming and prone to error.

BRIEF DESCRIPTION OF THE DRAWINGS

The embodiments are illustrated by way of example and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for additional message information handling for applications are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one embodiment. Thus, the appearances of these phrases in various places throughout this specification are not necessarily all referring to the same embodiment. Furthermore, the particular features, structures, or characteristics may be combined in any suitable manner in one or more embodiments.

Figure 1:
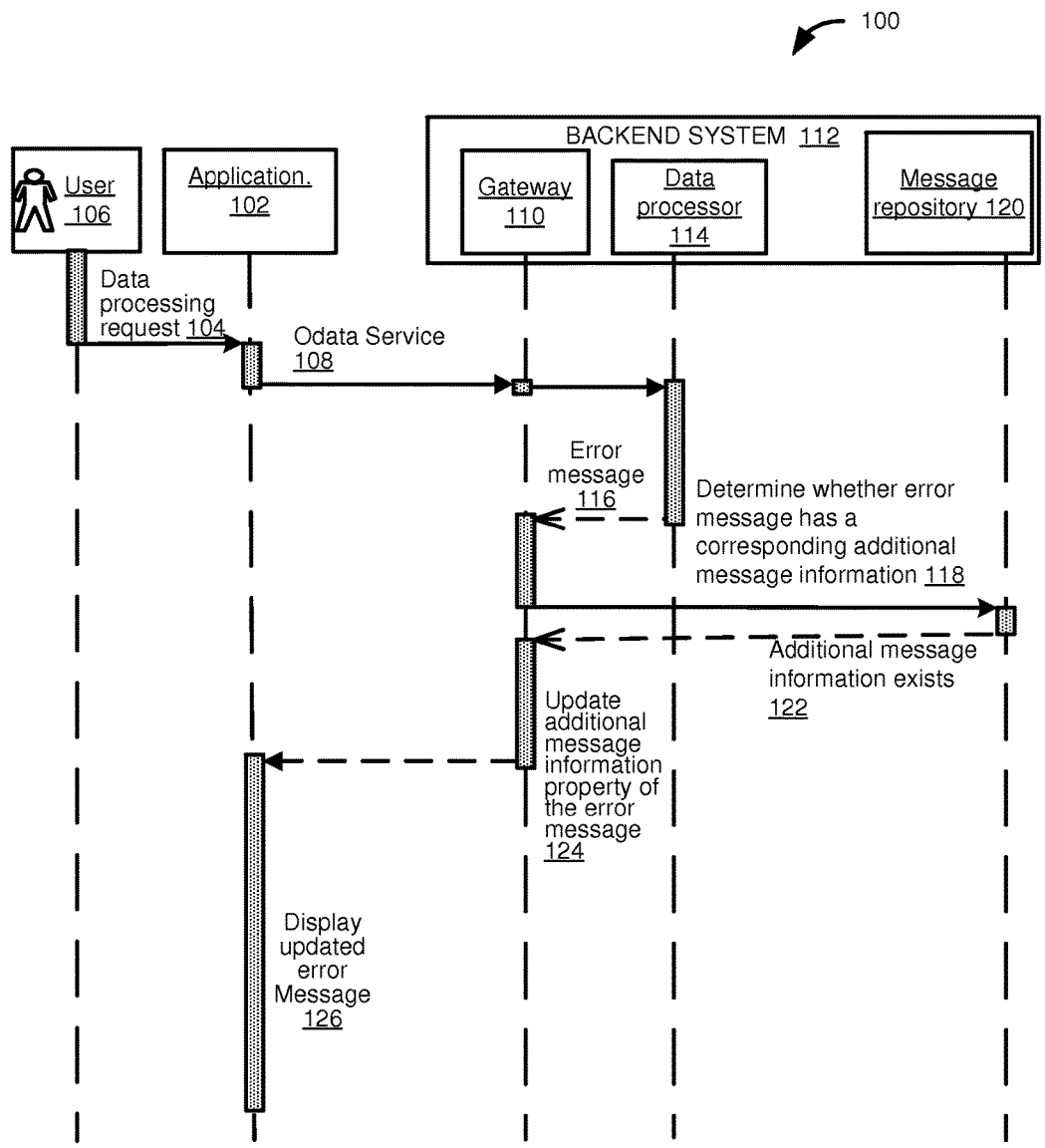
FIG. 1 is a sequence diagram illustrating a process to display an additional message information related to a product, according to an embodiment.

FIG. 1 is a sequence diagram 100 illustrating a process to display an additional message information related to a product, according to an embodiment. A product may be a software product that may be executable on a wide spectrum of devices, for example, a cellular or satellite telephone, laptop computer, personal digital assistant, electronic book reader, wearable device such as smart watch, intelligent eyewear, etc. Different applications may be associated to the software product. In one embodiment, the different applications associated to the software product may be applications executing on the product. For example, SAP S/4 HANA® is a software product that has several applications executing on it. In one embodiment, the application may be a transaction application that may allow a user to request data from the backend system. The backend system may execute the request and may also provide the status of execution, for example success or error, to the application. A backend system is a system that manages different resources, for example, orders, inventory, and supply processing.

Initially an application 102 receives a data processing request 104. The data processing request 104 may be received from a user 106 at a user interface of the application 102. The data processing request 104 may be a request, for example, to retrieve data based on certain user input, to execute a particular transaction, or to provide/change data for a particular data field, etc. After the application 102 receives the data processing request 104, an Open data (Odata) service 108 is called to forward the data processing request 104 to a gateway 110 at the backend system 112. OData or Odata Protocol is an open web protocol for querying and updating data. The protocol may be used by a consumer to query a data source over the HTTP protocol and get the result back in formats like Atom, JSON or plain XML. A gateway 110 is a computer program that establishes a communication between different applications, an application and a service, or between different systems. In one embodiment, the gateway is SAP Netweaver® Gateway.

The received data processing request 104 is then executed at a data processor 114. In one embodiment, the data processor 114 processes the data processing request based on a domain logic. A domain logic is the part of the program that encodes the real-world rules that determines processing of data, for example creating, displaying, storing, and changing of data. For example, a data processing request may be to "Retrieve Employee data for company ABC". The backend system 112 may process this data processing request to retrieve employee data for company ABC. In case an error occurs during execution of the data processing request, then the data processor 114 returns an error message 116 corresponding to the detected error. The error message 116 may be forwarded to the gateway 110 of the backed system 112. In one embodiment, the gateway 110 then determines whether the error message has a corresponding additional error information 118. The additional message information may provide additional details related to the detected data processing error. For example, the additional message information may provide a detailed explanation of the error, a help information for resolving the error, etc.

In one embodiment, the gateway 110 calls an additional message information API to determine whether a message repository 120 includes an additional message information corresponding to the determined error message. The message repository 120 may include a mapping of error messages and additional message information. The message repository 120 may be, for example, a T100 message repository provided by SAP SE®. For example, the employee data for company ABC may have been deleted before receiving the data processing request. In this case, the returned error message may be that the employee data is not available. The additional message information API then determines from a message repository 120 the additional message information, which is a link for company ABC, corresponding to the determined error message.

In one embodiment, the message repository 120 may include several additional message information that may be in part or whole not be relevant to the product related to the application. In this case, these additional error information may provide user with incorrect information. In order to provide relevant additional message information, a trace operation is performed to detect error messages that were received for previously received data processing requests. Tracing is a use of logging to record information about a program's execution. The error messages received after the tracing operation are evaluated to determine whether the information included in these messages is related to the product. An error message may be related to a product if the error or the suggested solution included in the error message are relevant for the product and do not include any irrelevant information. After the evaluation, a list of error messages related to the product is determined. The additional message information may then be identified from the determined list of error messages relevant to the product. The determined additional message information therefore provides relevant and correct error information and solution to the user.

In case the additional message information API determines that an additional message information exists 122 corresponding to the error message 116 then the additional message information API sends a message to the gateway 110 indicating that the error message has a corresponding additional message information. Based on the determination, the gateway 110 updates an additional message information property of the error message 124 to indicate that the error message 116 has a corresponding additional message information. In one embodiment, the gateway 110 then sends the error message with the updated additional message information property to the application. In one embodiment, the error message, with the updated additional message information, is then displayed at 126 at a user interface of the application 102. As shown, the processing of the additional message information is being handled at the backend system and the application is only being used for displaying the additional message information. This ensures that the entire error message handling is performed automatically at the backend system and the developer does not have to separately code for each of the application to determine and retrieve additional message information from the backend system.

In one embodiment, the error message that has an updated additional message information property may be presented with an additional message information indicator that indicates that the updated error message has the corresponding additional message information. For example, the updated error message may be indicated with a different background color, a different font text, or additional button, etc. to indicate that the updated error message has a corresponding additional message information. In one embodiment, a popover message is provided adjacent the error message. The popover message may include a link to view details related to the additional message information.

Figure 2A:
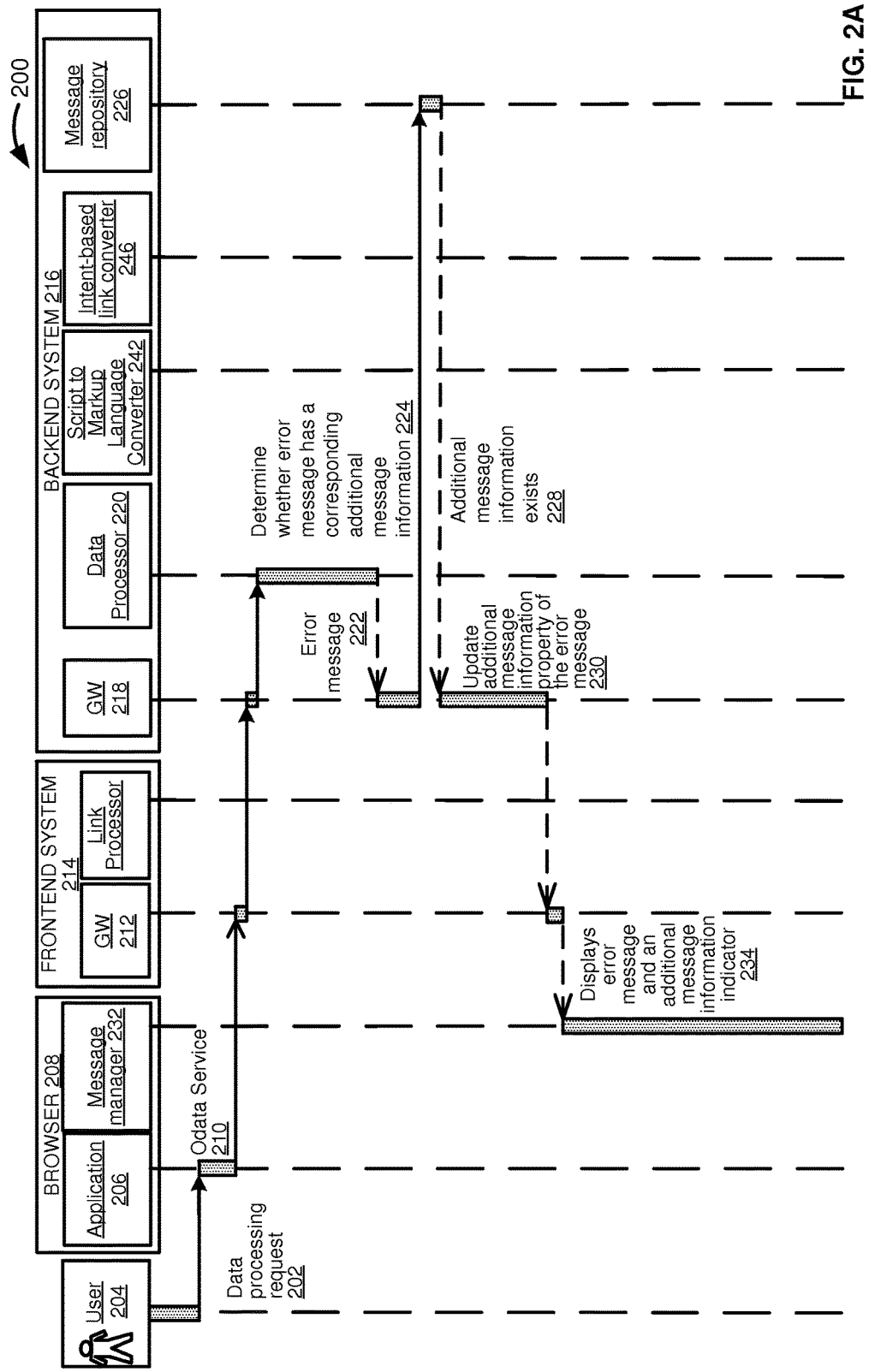
FIGS. 2A-2C is a detailed sequence diagram illustrating a process to display an additional message information related to a product, according to an embodiment.
Figure 2B:
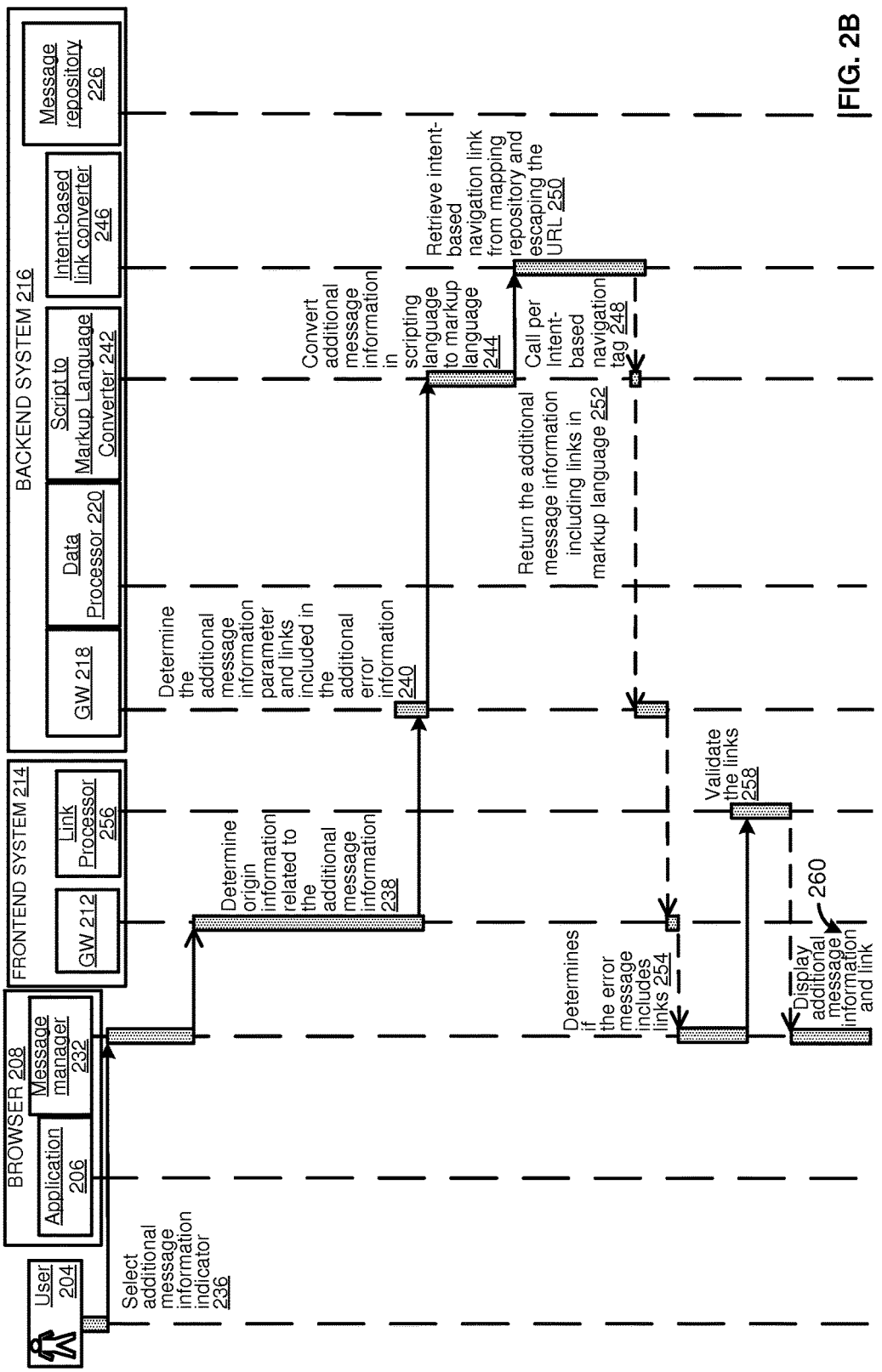
Figure 2C:
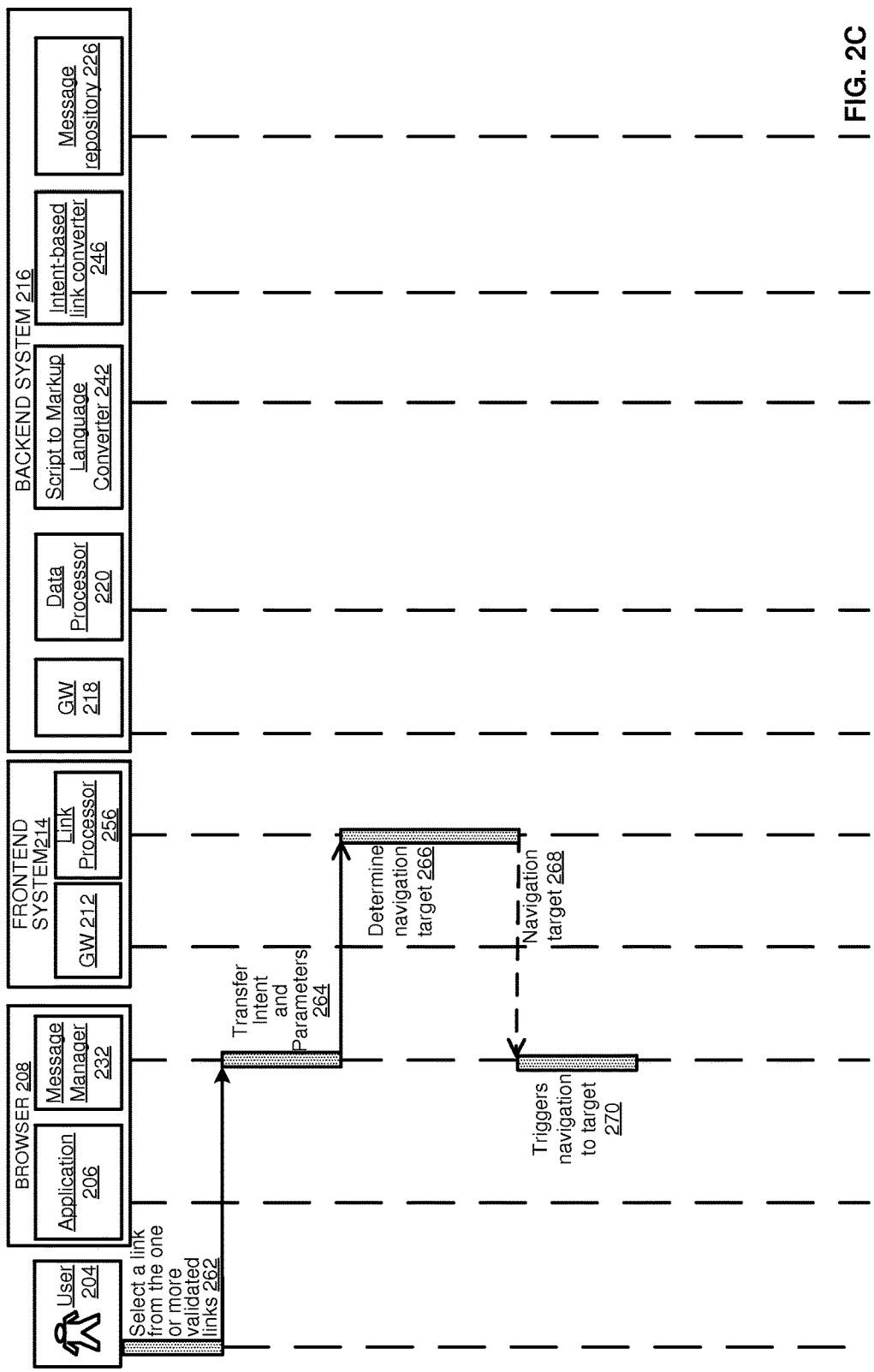

FIGS. 2A-2C is a sequence diagram 200 illustrating a process to display an additional message information related to a product, according to an embodiment. Initially a data processing request 202 may be received from a user 204 at a user interface of an application 206. The application 206 may be included in a browser 208 that allows a user 204 to provide the data processing request 202. In one embodiment, the browser 208 may be a SAP® UI5 browser or an HTML browser. A browser or web browser is a software application for retrieving, presenting, and traversing information resources from a data store. The application 206 may be a SAP Fiori® application provided by SAP® SE. The application 206 calls an Odata service 210 to forward the data processing request 202 to a gateway (GW) 212 at a front end system 214. A frontend system 214 is an interface between a user 204 and a backend system 216. The frontend system 214 may be a software application or the combination or hardware, software and network resources. The gateway (GW) 212 in the frontend system 214 facilitates communication between the application 206 and the backend system 216, and processes information received at the gateway 212 of the front end system 214.

In one embodiment, the application 206 calls an Odata service 210 to forward the data processing request to the gateway 212 of the frontend system 214. The Odata service 210 may be a combination of several services for transmitting data, handling error during processing of the transmitted data, etc. The gateway (GW) 212 at the frontend system 214 then forwards the data to a gateway (GW) 218 at the backend system 216. The gateway 218 at the backend system 216 then sends the data processing request 202, as an Odata service, to a data processor 220 that has a domain logic for processing the data processing request 202. The backend system 216 may be a business object processing framework (BOPF) infrastructure. A BOPF is a model-driven approach and infrastructure that is used for developing business objects. The BOPF manages the entire life cycle of business objects and covers all aspects of business application development. The BOPF allows the building of applications on a stable and customer-proved infrastructure.

In case an error occurs during processing the data processing request 202 then the data processor 220 determines an error message 222 corresponding to the detected error. In one embodiment, the error message 222 is a T100 message provided by SAP SE™. T100 is a standard SAP® Table which is used to store messages. T100 defines an error message corresponding to a detected error/exception. The determined T100 message includes an error code, an error message, and a list of variables, for example, transaction id that identifies the transaction to which the error message is related, etc. The error message may be, for example, "text not found". The error message 222 including the error code, error message, and the list of variables are then added to a message container. The message container then forwards the error message to the gateway (GW) 218 at the backend system 216.

The gateway (GW) 218 at the backend system 216 then determines whether an additional message information exist corresponding to the determined error message 224. An additional message information may be used to further explain the error message. An additional message information may also include help information for resolving the error defined in the error message. In one embodiment, the additional message information is a long text that is part of a T100 message used in SAP® system.

In one embodiment, the additional message information includes navigation links, for example, an intent-based navigation link or a content based navigation link. A link may be a means for accessing a resource. In one embodiment a link may be a Uniform Resource Locator (URL). The content based navigation link may be a knowledge warehouse based navigation link. A knowledge warehouse is a component of an enterprise's knowledge management system where knowledge is developed, stored, organized, processed, and disseminated. In one embodiment, the content based navigation link is a link, for example, to the help files related to the error defined by the error message. An intent-based navigation allows users to launch applications in different views or modes depending on the runtime parameters. For example, an intent based navigation link for accessing a sales data may provide a different sales dataset when requested by a manager compared to when the request is received from an employee. In one embodiment, the intent-based navigation link is SAP Fiori® intent-based navigation. The intent-based navigation links are links to view applications in different views or modes.

In one embodiment, the additional message information including links are provided in a scripting language, for example, SAPScript®. SAPScript® is the SAP® text-processing system. SAPScript® is used to print preformatted text in pre-formatted forms. The tags for the different elements, including links, in the additional message information may also be provided in SAPScript®. For example, the tags for an intent-based navigation link may be provided in SAPScript®. A tag of an intent-based navigation link is uniquely identified by an object key and an action key. In one embodiment, SAPScript® defines a restriction on the number of characters for the tags. In this case, the tag for intent-based navigation link, including an object key and an action key, may have more characters then allowed by SAPScript®. Another issue with the intent-based navigation link in SAPScript® is that the different input parameters and variables included in the intent-based navigation target are represented in SAPScript® by an "&" operator, the usage of which may not be possible within a tag.

To address the issue of input parameters, the input-parameters in the intent-based navigation link may be represented as variables V1, V2, V3, etc. In one embodiment, a bracket operator may be used for variables, for example {V1}, to differentiate between a variable and a value. To include the variables in the intent-based navigation link a sub-tag is included, in the intent-based navigation link, along with the primary tag of the intent-based navigation link. The sub-tag includes the different input parameters as variables. For example, consider that an intent-based navigation link has four parameters V1, V2, V3 and V4. In this case if the primary tag of the intent-based navigation key is DS, a sub-tag NAVI.KEY including four input variables V1, V2, V3, V4 are included in the tag of the intent-based navigation key. The obtained tag for the intent-based navigation link may be represented as:
<DS:NAVI.KEY (V1, V2, V3, V4)> link description </>.
The variable V1, V2, V3, and V4 represent the four input variables for the intent-based navigation link.

Next, the tag length issue for the intent-based navigation link is resolved by mapping the obtained navigation link to a intent-based navigation key that has a text size within the size limit defined for SAPScript®. For example, an intent-based navigation link:
MyObject—MyAction?Parameter 1={V1} and Parameter 2={V2} may be mapped to an intent navigation key ObjActionX1.
The mapping of the link with the navigation key may be stored in a mapping repository.
The mapping repository may also provide an API to perform validation check for any newly received intent-based navigation link.

In one embodiment, the gateway (GW) 218 at the backend system 216 calls an additional message information API to identify the additional message information corresponding to a message class/id of the error message received during processing the data processing request. The additional message information API may determine the additional message information from the additional message information stored in the message repository. In one embodiment, the additional message information may be identified from several additional message information relevant to the product stored in a message repository 226. The different additional message information relevant to the product may be determined by a tracing operation on test systems that detects the different additional message information returned to the application for previously received data processing requests. The status of the additional message information that are not detected as relevant to the product, after the tracing operation, may be set as "non-relevant". The additional message information and its status are stored at the message repository 226. In case the additional message information, stored in the message repository 226, corresponding to an error message has a status "non-relevant" then the additional message information API may not return any information to indicate that there is no additional message information corresponding to the error message.

Next in case the additional message information API identifies that an additional message information exists 228 corresponding to the error message 226 in the message repository 226 then the gateway (GW) 218 at the backend system updates an additional message information property of the error message 230. For updating the additional message information property, the gateway (GW) 218 adds a new attribute additional message information to the error message property. The updated additional message information attribute may then be updated with additional message information provisioning service, additional message information variables, and an additional error origin information. The additional error origin information is used to identify the backend system where the data processing error occurred. The additional error provisioning service is a service defined for processing the additional message information. Processing the additional message information may include retrieving the additional message information from a message repository, converting the additional message information text to a different format, forwarding the additional message information to the user interface, etc. For example, consider that the following error message received at the gateway after processing a data processing request.

| Message ID | ZZ1 |
|---|---|
| Message Number | 001 |
| Message Variable 1 | 1000 |
| Message Variable 2 | Miller |
| Message Variable 3 | 02 |
| Message Variable 4 | London |

The Gateway adds an additional message information property attribute for this message and updates the additional message information property attribute with the following value:
/IWBEP/MESSAGE_TEXT, o=<SystemAlias>/ T100_Longtexts (MSGID="ZZ1", MSGNO="001", MSGV1="1000", MSGV2="Miller", MSGV3="02", MSGV4="London")$value.

The value "/IWBEP/MESSAGE_TEXT" in the additional message information represents the additional message information provisioning service. The value "o=<SystemAlias>" in the additional message information is the message origin information and identifies the backend system where the data processing error occurred.

The error message with the updated additional message information property is then forwarded to the application. In one embodiment, an Odata response including the error message, with the updated additional message information property, is received by the gateway 212 of the frontend system 214 from the gateway 218 of the backend system 216. The gateway (GW) 212 of the frontend system 214 then extracts the error message with the updated additional message information property from the Odata response and forwards the error message to a message manager 232 included in the browser 208. The message manager 232 then determines whether the additional message information property field of the error message is updated. The additional message information property of the error message may be updated with the additional message information service, the additional message information origin information, and the various variables included in the error message. In case the message manager 232 determines that the additional message information property of the error message is updated then a message popover control displays an additional message information indicator along with the error message 234. The additional message information indicator may be a message, for example, "show additional message information details" included in a popover to indicate that the error message has a corresponding additional message information. In one embodiment, the message popover control is a control that can handle multiple messages within SAP Fiori®. In combination with a message manager, it automatically displays messages that are triggered at defined validation points. In this case, the validation point is the detection of updated additional message information property by the message manager.

Next a user 204 may select 236 additional message information indicator at a user interface of the application 206. The user may select the additional message information to receive details of the additional message information corresponding to the error message. In one embodiment, the additional message information indicator may be a link and the user 204 selects the indicator by clicking on the link. After the additional message information indicator is selected, the message manager calls the additional message information provisioning service included in the additional message information property of the error message. In one embodiment the additional message information service is defined to retrieve the additional message information and display it at the user interface. The called additional message information provisioning service checks the additional message information property of the error message, at the gateway 212 of the frontend system 214, to determine the origin information related to the additional message information 238. The origin information may provide details of the system at which the data processing error occurred. For example, the origin information may indicate a backend system where the data processing error occurred.

Next the additional message information service 240 determines the additional message information parameter and the links included in the additional message information property of the error message, at the gateway 218 of the backend system 216. In one embodiment, the backend system 216 may be the system that is identified by the origin information included in the additional message information property of the error message. The additional message information, including the additional message parameters and the links, corresponding to the error message may be retrieved from the additional message information property of the error message by the gateway 218 of the backend system 216. In one embodiment, the additional message information is in a scripting language. For example, the additional message information may be in SAPScript®. In one embodiment, the additional message information in the scripting language has to be converted to a markup language. The additional message information may be converted to the markup language snippets that is compliant with a user interface standard. For example an additional message information in SAPScript® may be converted to additional message information in HTML format that is compliant with SAPUI5®. SAPUI5® (SAP® user interface for HTML 5) is a collection of libraries that developers can use to build desktop and mobile applications that run in a browser. With SAPUI5® JavaScript toolkit, developers can build SAP® web applications using HTML5 web development standards. The additional message information in HTML format may include several HTML snippets.

The additional message information provisioning service, included in the additional message information repository, calls a script-to-markup language converter 242 to convert 244 the additional message information in the scripting language to additional message information in a markup language. In one embodiment, the script-to-markup language converter converts additional message information in any format to an additional message information in a markup language. In one embodiment, the additional message information is converted such that it includes standard markup language semantically correct tags that are defined by the markup language standard, for example, HTML5 standard. In one embodiment, the converter may maintain the formatting, for example bold/italic like formatting, of the additional message information in the script language in the converted additional message information in the markup language. For example, the obtained additional message information in the HTML format after the conversion may be:
<H1>Diagnosis</H1>
<P> The system encountered a <B> fatal Error!</B><P/>

In one embodiment, the script-to-markup language converter 242 also converts the links, intent-based navigation links and content based navigation links, included in the additional message information to links in markup language. The content based navigation link in the scripting language is converted to content based navigation link in markup language format. For example a content based navigation link may be a help link, which provides help information related to a product. The help link in scripting language is converted to a help link in markup language, for example, http://help.xxxx.com.

In one embodiment, the script-to-markup language converter 242 calls an intent-based link converter 246 to convert the intent-based navigation link in scripting language to an intent-based navigation link in markup language. The intent-based link converter 246 may be called 248 per intent-based navigation link included in the additional message information. A mapping repository may be storing an intent-based navigation link in the scripting language corresponding to the navigation key stored in the additional message information property. The intent-based link converter 246 retrieves 250 the intent-based navigation link corresponding to the navigation key from the mapping repository and then escapes the link to obtain the intent-based navigation link in markup language. For example, an entry in the mapping repository may be:

| Navigation key | Intent-based Navigation Link |
|---|---|
| OBJACTIONX2 | MyObject-MyAction2?Parameter 1 = {V1}& Parameter 2 = {V2} & Parameter 3 = 1000 &Parameter 4 = {V4} |

The mapping repository retrieves the intent-based navigation link from the repository. The mapping repository also provides values for fixed value parameters. For example, the mapping repository provides a value 1000 for parameter 3. The intent-based link converter 246 escapes the intent navigation link in scripting language format to obtain the intent-based navigation link in HTML format. Escaping is the process of replacing portions of the links such that there is no conflict between the different variables and reserved characters defined in the markup language, for example, HTML language. The navigation link may be double escaped, for example, the navigation link may be first escaped with respect to the object, action, and parameter identifiers and then escaped for a second time with respect to the parameter values. The intent-based link converter then sends the determined intent navigation link in markup language to the script-to-markup language converter 242. The script-to-markup language converter 242 returns 252 the converted additional message information including the converted links in markup language to a gateway 218 at the backend system 216. A gateway 212 at the front end system 214 extracts the additional message information in the markup language and forwards it to a message manager 232. In one embodiment, the additional message information is retrieved as an Odata response to the Odata service called for processing the data processing request.

In one embodiment, the message manager 232 analyzes the additional message information in the markup language to determine 254 whether the additional message information includes any links, intent-based navigation links and content based navigation links, in the received additional message information. The links included in the additional message information are extracted by the message manager 232 and transferred to a link processor 256. The link processor 256 then validates the link 258 to determine whether the link is semantically correct and whether it has a valid navigation target. Navigation target is a webpage or document that is returned and displayed to a user when the link is executed. In case of content based navigation link a navigation target may be, for example, a help page linked to the product. In case of intent-based navigation, there may be several navigation targets that are mapped to the intent-based navigation link. Each of the link may correspond to a particular user profile and/or deployment scenario. For example, a navigation intent key may be for retrieving employee data. In this case the intent based navigation key may have a different navigation target for an employee and a manager such that a different version of an employee fact sheet is displayed for a manager than for employees. The intent-based navigation key may be validated if the corresponding navigation target for one of the scenarios is valid. The links after the validation are returned to the message manager 232. A message popover control may then display 260 the additional message information including the links. In one embodiment, the links that are determined as not valid by the link processor are shown as inactive at the message popover control.

A user 204 may then select 262 one of the links displayed by the message popover control. In case an intent-based navigation link is selected, then the message manager 232 transfers 264 the intent and the message parameters related to the intent-based navigation link to a link processor 256. The intent may include a user profile of the user selecting the link or a deployment scenario. The link processor 256 uses the received intent and parameter values to determine 266 one of the navigation targets. The navigation target may include an URL of an application, webpage or document. The link processor 256 then forwards the navigation target, for example, URL to the message manager 232. The message manager 232 then triggers the navigation to the target 270. In one embodiment, triggering the navigation to the target 270 includes executing the navigation target to obtain a target, for example, application, webpage, or document. The obtained target, application, webpage, or document is then displayed at a user interface of the application. As shown, the error message handling, including determination of additional message information, conversion of the error message into a markup language are performed at the backend system and the front end system and the user interface are only displaying and validating the determined additional message information. Therefore the logic for additional message information is not being executed twice in the frontend system and the backend system.

Figure 3:
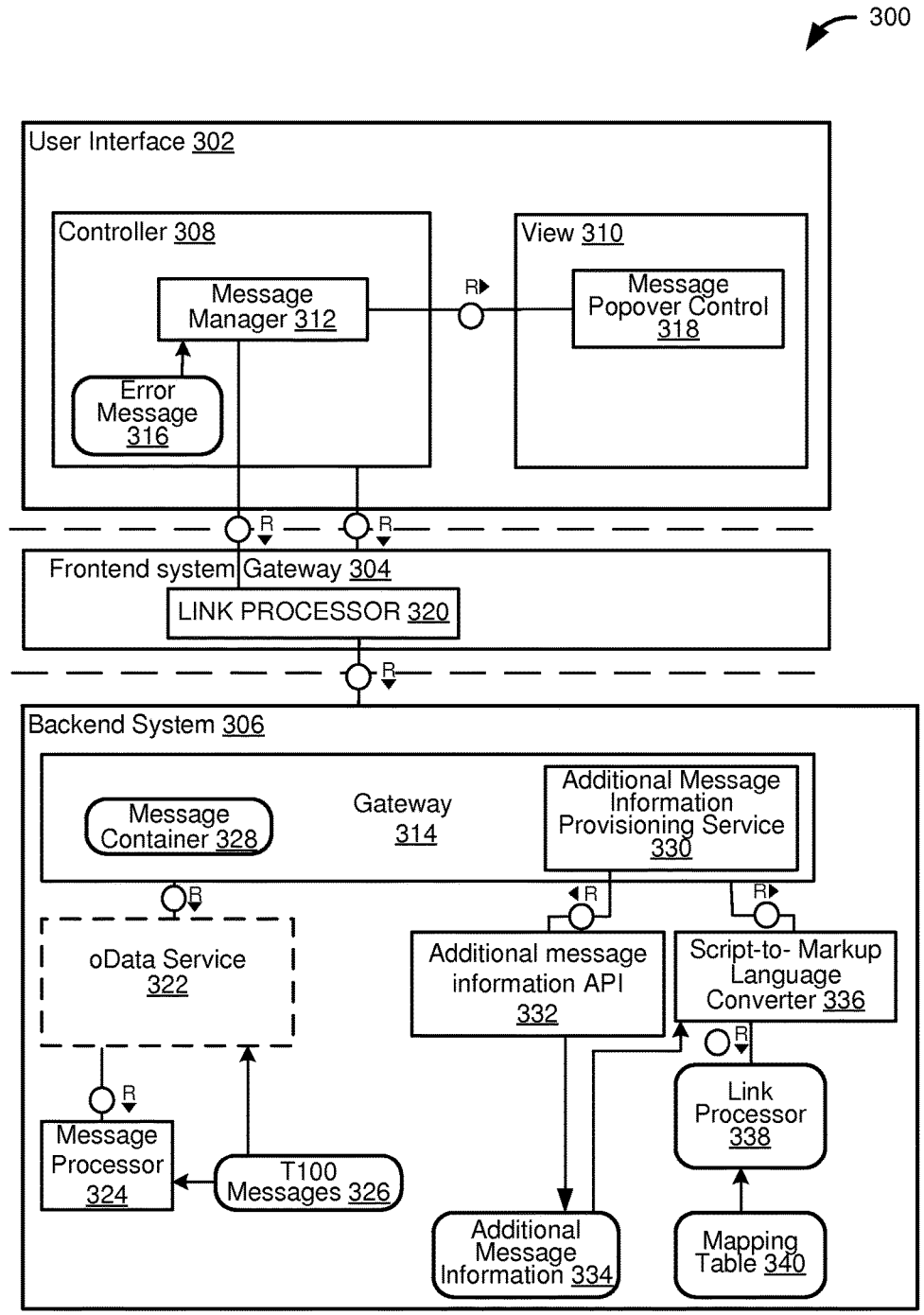
FIG. 3 is a block diagram illustrating a system to display an additional message information related to a product, according to an embodiment

FIG. 3 is a block diagram illustrating a system 300 for displaying additional message information, according to an embodiment. The system 300 includes a user interface 302, a frontend system gateway 304, and a backend system 306. In one embodiment, the error message handling is performed at the backend system and the frontend system gateway 304 and user interface 302 are only retrieving and displaying the generated additional message information. The user interface 302 includes a controller 308 for sending requests and receiving additional message information and a view 310 for displaying the error message and additional message information. The controller 308 includes a message manager 312 that sends a data processing request to a gateway 314 of the backend system 306. The message manager 312 also receives the error message 316 from the backend system 306. The message manager 312 also determines whether the error message has an updated additional message information property. In case the error message 316 has the updated additional message information property then the message popover control 318 displays an additional message information indicator to indicate that the error message has a corresponding additional message information. The message manager 312 also calls an additional message information provisioning service for retrieving the additional message information from an error repository and sending it back to the message manager 312.

In one embodiment, the frontend system gateway 304 is an interface for communication between the backend system 306 and the user interface 302. The frontend system gateway 304 includes a link processor 320 that validates the link and also triggers navigation to a navigation target of the link. The backend system 206 includes an Odata service 322 that calls a message processor 324 for processing the received message processing request. In case an error occurs then a T100 message 326 provides an error message, corresponding to the error that occurred during processing the message processing request, to the message processor 324. The error message, including error message id, error message number, error message parameters are then sent to the gateway 314 of the backend system 306 via the message container 328.

The gateway 314 also includes an additional message information provisioning service 330 that calls an additional message information API 332 to retrieve the additional message information 334. A script-to-markup language converter 336 converts the additional message information in script language to an additional message information in markup language. In case the additional message information includes an intent-based navigation link then an intent-based link processor 338 retrieves the intent-based navigation link in the script language from a mapping table 340 and then converts the intent-based navigation link in scripting language to the intent-based navigation link in markup language.

Figure 4A:
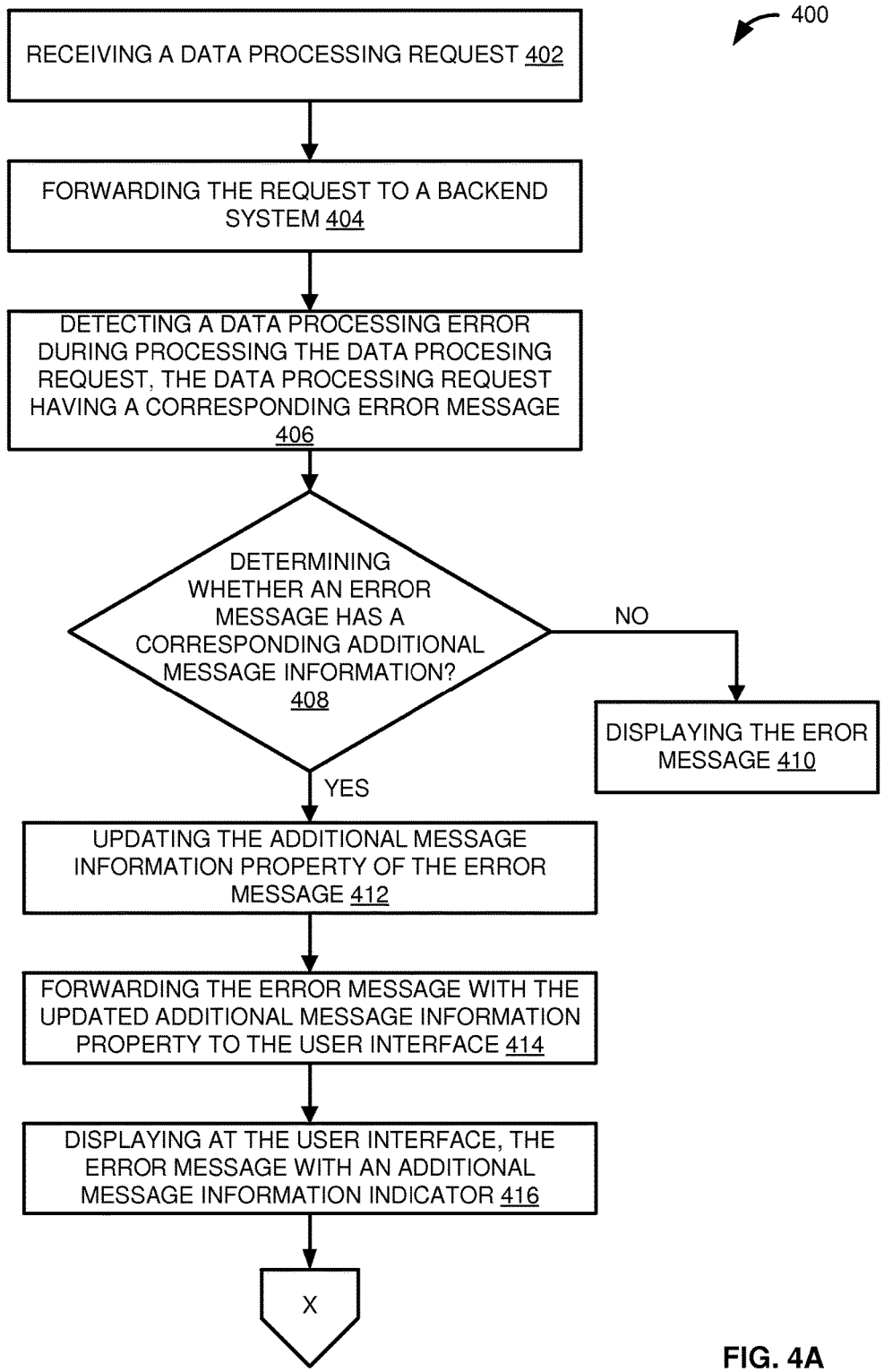
FIGS. 4A-4B is a flow diagram illustrating a process to display an additional message information related to a product, according to an embodiment.
Figure 4B:
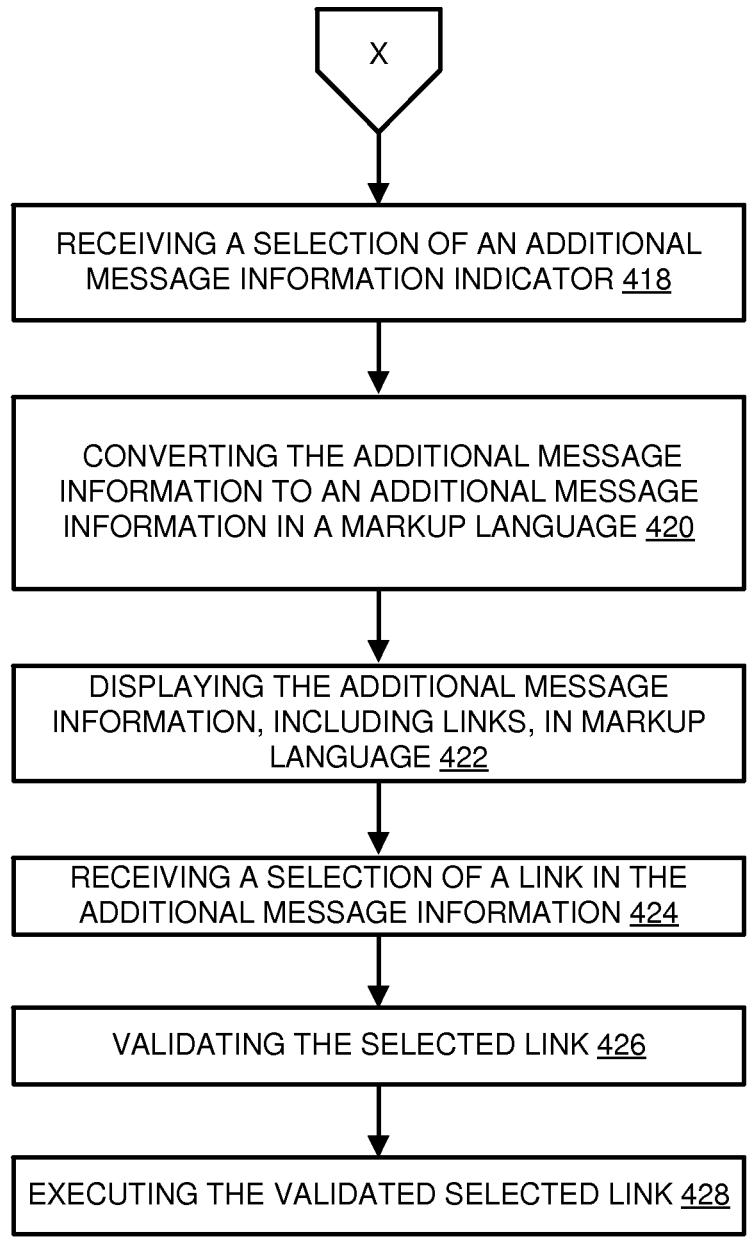

FIGS. 4A-4B is a flow diagram illustrating a process 400 to display the additional error information, according to an embodiment. Initially at 402 a data processing request is received at a user interface of the application. Next at 404 the received data processing request is then forwarded to a backend system, for processing the data processing request. At the backend system a data processing error may be detected at 406 during processing the data processing request. In one embodiment, the detected error may have a corresponding error message defined for the detected error. Next at 408 the determination is made at the backend system whether the error message corresponding to the detected error has a corresponding additional error information. In case, there is no additional error information corresponding to the error message then the error is message may be displayed at the application 410.

Next in case there is an additional error information corresponding to the error message then the additional error information property of the error message is updated 412. The error message with the updated additional error information property is then forwarded to the user interface 414. The error message with the additional error information indicator is then displayed at the user interface 416. Next a selection is received for the additional error information indicator 418. Next the additional error information is converted to an additional error information to an additional error information in a markup language 420. The additional error information, including links, is then displayed at the user interface 422. A selection may be received for one of the links in the additional error information. The link is then validated 426 and finally executed at 428 to obtain a target document.

Some embodiments may include the above-described methods being written as one or more software components. These components, and the functionality associated may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 5:
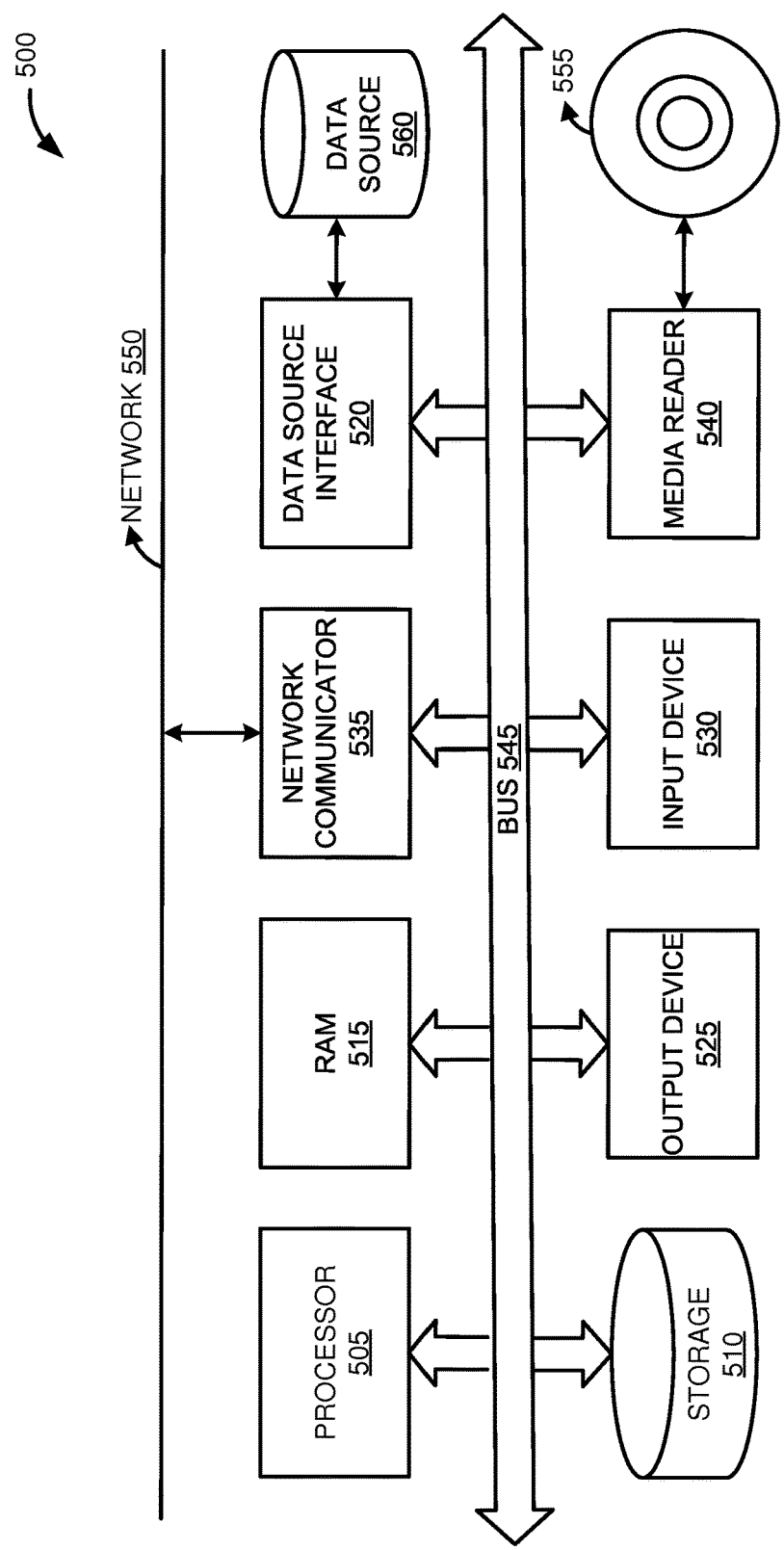
FIG. 5 is a block diagram illustrating a computing environment for displaying an additional message information related to a product, according to an embodiment.

FIG. 5 is a block diagram of an exemplary computer system 500. The computer system 500 includes a processor 505 that executes software instructions or code stored on a computer readable storage medium 555 to perform to perform the above-illustrated methods. The computer system 500 includes a media reader 540 to read the instructions from the computer readable storage medium 555 and store the instructions in storage 510 or in random access memory (RAM) 515. The storage 510 provides a large space for keeping static data where at least some instructions could be stored for later execution. The stored instructions may be further compiled to generate other representations of the instructions and dynamically stored in the RAM 506. The processor 505 reads instructions from the RAM 515 and performs actions as instructed. According to one embodiment, the computer system 500 further includes an output device 525 (e.g., a display) to provide at least some of the results of the execution as output including, but not limited to, visual information to users and an input device 530 to provide a user or another device with means for entering data and/or otherwise interact with the computer system 500. Output devices 525 and input devices 530 could be joined by one or more additional peripherals to further expand the capabilities of the computer system 500. A network communicator 535 may be provided to connect the computer system 500 to a network 550 and in turn to other devices connected to the network 550 including other clients, servers, data stores, and interfaces, for instance. The modules of the computer system 500 are interconnected via a bus 545. Computer system 500 includes a data source interface 520 to access data source 560. The data source 560 can be accessed via one or more abstraction layers implemented in hardware or software. For example, the data source 560 may be accessed by network 550. In some embodiments the data source 560 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the invention are described herein for illustrative purposes, various equivalent modifications are possible within the scope of the invention, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to display an additional message information relevant to a product, the method comprising:
receiving, by at least one processor of a backend system, and from a separate frontend system, a data processing request related to a product;
detecting, by at least one processor of the backend system, a data processing error during processing of the data processing request by the backend system;
determining, automatically by at least one processor of the backend system, whether an error message associated with the data processing error related to the product, has a corresponding additional message information related to the product, wherein the error message corresponds to one or more products;
tracing, by at least one processor of the backend system, the error message, to identify that the error message corresponds to the data processing error related to the product, wherein the identification includes determining a mapping of the error message and the corresponding additional message information related to the product;
based on the determined corresponding additional message information, updating, by at least one processor of the backend system, an additional message information property of the error message to indicate that the error message has the corresponding additional message information;
based on the updated additional message information property, converting, by at least one processor of the backend system, the corresponding additional message information to a converted additional message information in a markup language;
forwarding, by at least one processor of the backend system, the converted additional message information to a user interface of the frontend system;
receiving, by at least one processor of the backend system, an additional error selection indicator regarding the converted additional message information forwarded for displaying at the user interface of the frontend system; and
responsive to receiving the additional error selection indicator, forwarding, by at least one processor of the backend system, for displaying at the user interface of the frontend system, a mark-up language comprising a selectable link to a target document including additional error information.

2. The computer implemented method according to claim 1, wherein determining whether the error message has the corresponding additional message information includes:
identifying, by at least one processor of the backend system, the corresponding additional message information from a plurality of identified additional message information, wherein identifying the corresponding additional message information includes:
detecting, by at least one processor of the backend system, a plurality of identified error messages received for one or more data processing requests related to the product; and
identifying, by at least one processor of the backend system, the corresponding additional message information from the detected plurality of identified error messages.

3. The computer implemented method according to claim 1, further comprising:
receiving, at least by one processor of the frontend system, via the user interface, the data processing request related to the product;
forwarding, by at least one processor of the frontend system, the data processing request to the backend system;
detecting, by at least one processor of the backend system, the data processing error for the received data processing request;

forwarding, by at least one processor of the backend system, to the user interface of the frontend system, the error message corresponding to the determined data processing error; and sending, by at least one processor of the backend system, to display at the user interface of the frontend system, the error message and an additional message information indicator, wherein the additional message information indicator indicates that the error message has the corresponding additional message information.

4. The computer implemented method according to claim 3, further comprising:

receiving, at least by one processor of the frontend system, the selection of the additional message information indicator; and based on the updated additional message information property, forwarding, at least by one processor of the frontend system, the error message to the backend system.

5. The computer implemented method according to 1, further comprising:

validating, at least by one processor of the frontend system, the one or more links, by determining whether the one or more navigation links has a corresponding implementation target.

6. The computer implemented method according to claim 5, further comprising:

from the one or more navigation links, executing, at least by one processor of the frontend system, the selected navigation link to display a target document corresponding to the selected navigation link.

7. The computer implemented method according to claim 1, wherein converting the additional message information to a converted additional message information includes: mapping, by at least one processor of the backend system, one or more intent-based navigation links included in the corresponding additional message information, to a navigation key.

8. A non-transitory computer-readable medium storing instructions, which when executed by a computer, cause the computer to perform operations, comprising:

receive an error message with a data processing error related to a product, wherein the error message can be used by one or more products;

determine whether the error message associated with the data processing error related to the product, has a corresponding additional message information related to the product, wherein the determination of the corresponding message is automated at a backend system;

trace the error message, to identify that the error message corresponds to the data processing error related to the product, wherein the identification includes determining a mapping of the error message and the corresponding additional message information related to the product;

based on the determined corresponding additional message information, update an additional message information property of the error message to indicate that the error message has the corresponding additional message information;

based on the updated additional message information property, convert the corresponding additional message information to a converted additional message information in a markup language;

forwarding the converted additional message information to the user interface of a frontend system;

receive an additional error selection indicator regarding the converted additional message information forwarded for displaying at the user interface of the frontend system; and responsive to receiving the additional error selection indicator, forward for displaying at the user interface of the frontend system, a mark-up language comprising a selectable link to a target document including additional error information.

9. The non-transitory computer readable medium of claim 8, further comprising instructions, which when executed by the computer, cause the computer to: identify the corresponding additional message information from a plurality of identified additional message information, wherein identifying the corresponding additional message information includes:

detect a plurality of identified error messages received for one or more data processing requests related to the product; and identify the corresponding additional message information from the detected plurality of identified error messages.

10. The non-transitory computer readable medium of claim 8, further comprising instructions, which when executed by the computer, cause the computer to:

receive a data processing request related to the product;

forward the data processing request to a backend system;

detect the data processing error for the received data processing request;

forward, to the user interface of the frontend system, the error message corresponding to the determined data processing error; and send the error message and an additional message information indicator, to display on the user interface of the frontend system, wherein the additional message information indicator indicates that the error message has the corresponding additional message information.

11. The non-transitory computer readable medium of claim 10, further comprising instructions, which when executed by the computer, cause the computer to:

receive the selection of the additional message information indicator; and based on the updated additional message information property, forward the error message to the backend system.

12. The non-transitory computer readable medium of claim 8, further comprising instructions, which when executed by the computer, cause the computer to:

validate the one or more links by determining whether the one or more navigation links has a corresponding implementation target.

13. The non-transitory computer readable medium of claim 12, further comprising instructions, which when executed by the computer, cause the computer to:

from the one or more navigation links, execute, by the processor of the computer, execute the selected navigation link to display a target document corresponding to the selected navigation link.

14. The non-transitory computer readable medium of claim 8, further comprising instructions, which when executed by the computer, cause the computer to: map one or more intent-based navigation links included in the corresponding additional message information to a navigation key.

15. A computer system to display an additional message information relevant to a product, the system comprising:
a memory to store a program code;
a processor communicatively coupled to the memory, the processor configured to execute the program code to:
receive, from a frontend system, a data processing request related to a product;
detect a data processing error during processing of the data processing request;
determine whether an error message associated with a data processing error related to a product, has a corresponding additional message information related to the product;
trace the error message, to identify that the error message corresponds to the data processing error related to the product, wherein the identification includes determining a mapping of the error message and the corresponding additional message information related to the product;
based on the determined corresponding additional message information, update an additional message information property of the error message to indicate that the error message has the corresponding additional message information;
based on the updated additional message information property, convert the corresponding additional message information to a converted additional message information in a markup language;
forwarding the converted additional message information to a user interface of a frontend system;
receive an additional error selection indicator regarding the converted additional message information forwarded for displaying at the user interface of the frontend system; and
responsive to receiving the additional error selection indicator, forward for displaying at the user interface of the frontend system, a mark-up language comprising a selectable link to a target document including additional error information.

16. The computer system of claim 15, wherein the processor further executes the program code to: identify the corresponding additional message information from a plurality of identified additional message information, wherein identifying the additional message information includes:
detect a plurality of identified error messages received for one or more data processing requests related to the product; and
identify the corresponding additional message information from the detected plurality of identified error messages.

17. The computer system of claim 15, wherein the processor, further executes the program code to:
receive a data processing request related to the product;
forward the data processing request to a backend system;
detect the data processing error for the received data processing request;
forward, to the user interface of the frontend system, the error message corresponding to the determined data processing error; and
send the error message and an additional message information indicator, to display on the user interface of the frontend system, wherein the additional message information indicator indicates that the error message has the corresponding additional message information.

18. The computer system of claim 17, wherein the processor further executes the program code to:
receive the selection of the additional message information indicator; and
based on the updated additional message information property, forward the error message to the backend system.

19. The computer system of claim 15, wherein the processor further executes the program code to:
validate the one or more links by determining whether the one or more navigation links has a corresponding implementation target.

20. The computer system of claim 19, wherein the processor, further executes the program code to:
from the one or more navigation links, execute the selected navigation link to display a target document corresponding to the selected navigation link.

* * * * *